Figure 1:
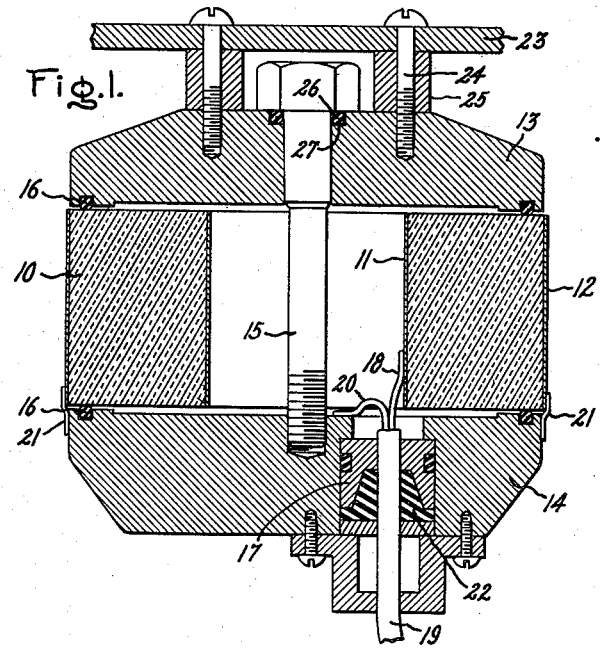

July 12, 1960

R. W. SAMSEL 2,945,208

COMPRESSIONAL WAVE TRANSDUCER

Filed Jan. 5, 1951

Inventor:
Richard W. Samsel,
by Paul A. Frank
His Attorney.

United States Patent Office 2,945,208
Patented July 12, 1960

---

2,945,208

COMPRESSIONAL WAVE TRANSDUCER

Richard W. Samsel, Schenectady, N.Y., assignor to General Electric Company, a corporation of New York Filed Jan. 5, 1951, Ser. No. 204,500

9 Claims. (Cl. 340—10)

My invention relates to transducers for translating high frequency compressional wave energy into electrical energy and vice versa and, more particularly, to such compressional wave energy transducers suitable for use in underwater object locating or signalling systems.

One of the most desirable patterns of compressional wave energy transmission or reception in some underwater locating or signalling systems, is the toroidal pattern. This toroidal pattern extends radially in all directions and substantially in the plane of the transducing element somewhat in the shape of a radially elongated doughnut.

Heretofore, it has required highly complicated equipment to obtain the simultaneous insonification throughout 360 degrees along substantially a single plane as in this toroidal pattern. The transducer must not only be capable of transmitting or receiving in all directions compressional waves of a frequency above several kilocycles, but should also have a reasonably rugged construction in order to be able to withstand strong hydrostatic pressures such as found in deep water. Such transducers have, therefore, been normally of the magneto-strictive or piezoelectric crystal type, employing a plurality of transducing elements mounted in suitable cylindrical stacks and electrically interconnected to give a composite signal. Each element is constructed to be substantially identical in its magneto-strictive or piezoelectric characteristics. As a consequence, such transducers are ordinarily both complex in construction and fairly expensive.

Accordingly, one of the principal objects of my invention is to provide a compressional wave transducer having a toroidal transmission or reception pattern which employs only a single piezoelectric element.

Another object of my invention is to provide a compressional wave transducer with a toroidal transmission or reception pattern which has a simple and economical construction.

A further object of my invention is to provide a comparatively simple compressional wave transducer which has a toroidal transmission or reception pattern and which is rugged enough to withstand strong hydrostatic pressures up to several hundred pounds per square inch.

In general, my simplified compressional wave transducer comprises a ceramic cylinder comprising principally a polycrystalline ferroelectric ceramic material such as barium titanate which has been activated along radial lines to exhibit a radial mode piezoelectric effect. The inner and outer cylindrical surfaces of the ceramic element are covered by suitable electrodes and opposite ends of the cylinder are enclosed in a fluid tight manner by rigid end plates. Only the outer peripheral surface of the cylinder, covered by a suitable electrode, is exposed to the compressional wave medium. The enclosed interior of the cylinder preferably comprises a dead air space that may be used for fastening the entire unit together. However, the space may also be filled with a suitable fluid to counteract strong external pressures where necessary.

Since an activated polycrystalline ceramic is employed as the electro-mechanical translating element of my invention, there is the possibility that the sensitivity of this element may deteriorate, due to such causes as accidental operation at abnormally high temperatures, or use or non-use over a long period of time. Accordingly, a further specific object of my invention is to provide a toroidal pattern transducer which may be easily adapted to be reactivated without disassembly.

The novel features which I believe to be characteristic of my invention are set forth with particularity in the appended claims. My invention itself, however, together with further objects and advantages thereof may best be understood by reference to the following description taken in connection with the accompanying drawing in which Fig. 1 is a cross-sectional view of a transducer embodying my invention, and Fig. 2 is a similar view of a modification of the transducer of Fig. 1 illustrating a construction enabling the transducer to be reactivated without disassembly.

Figure 2:
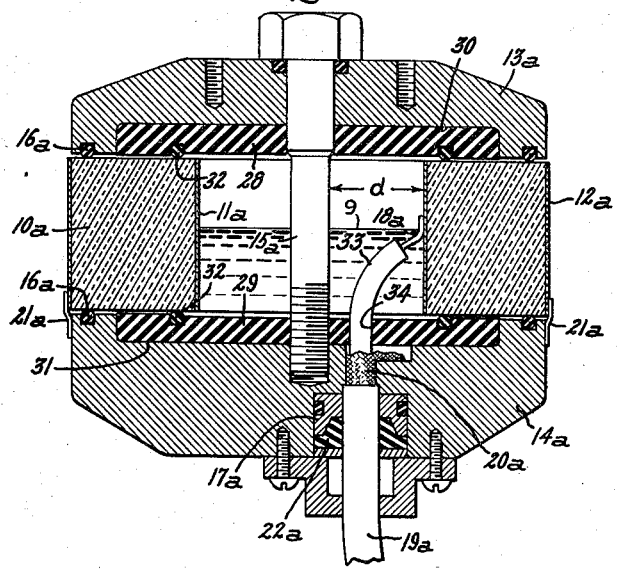

Referring to Fig. 1, I have shown my invention in one form as comprising a polycrystalline ferroelectric ceramic cylinder 10 preferably comprising principally barium titanate. Cylinder 10 has its inner and outer cylindrical surfaces covered by electrodes 11 and 12 respectively. Electrodes 11 and 12 are preferably film like and may comprise tinfoil secured to the ceramic by any suitable bonding material. Alternatively, the inner and outer cylindrical surfaces may be silvered to provide electrodes 11 and 12 respectively.

In order to enclose the entire unit and to confine the effective region of ceramic cylinder 10 to the external peripheral surface thereof, a pair of rigid end plates 13 and 14, preferably of a conducting metal, are secured together by such means as axially inserted bolt 15 to cover opposite sides of ceramic cylinder 10. End plates 13 and 14 are secured in a fluid tight manner but out of electric conducting relation with the end surfaces of the cylinder 10 by such means as an insulating rubber-like ring 16 which is interposed between the end plates 13 and 14 and the end surfaces of the cylinder 10, and which may be compressed tightly against these surfaces by tightening bolt 15. A connection to internal electrode 11 is provided through one end plate, such as plate 14, and may conveniently comprise a fluid-tight cable connection 17, as indicated. One conductor 18 of cable 19 is connected by such means as soldering to the inner electrode 11. The other conductor 20 of cable 19 is connected to end plate 14 which, in turn, is connected to outer electrode 12 through a plurality of contact fingers 21 extending between the circumference of plate 14 and the electrode 12. The cable conection 17 is made fluid-tight by such means as a cable sealing structure in which a resilient gasket 22 is pressed tightly against the walls of the cable 19.

The entire unit may conveniently be mounted to any portion of a vessel or other support 23, by such means as screws 24 which extend into upper plate 13 through an annular spacer 25. The passage of fluid around bolt 15 is prevented by such means as an annular gasket 26 seated within a shoulder 27 of plate 13 under the head of bolt 15.

The ferroelectric ceramic cylinder 10 is activated to vibrate radially when a voltage is applied between the electrodes 11 and 12, and conversely, to supply a voltage between these electrodes when a suitable radial pressure is exerted on the cylinder 10. Activation of the ceramic cylinder 10 is accomplished by subjecting the cylinder to a strong radial electric field to produce a corresponding polarization of the crystals thereof. This activation may be accomplished at room temperature with a very strong electric field, in the neighborhood of 40 to 60 volts per .001 inch of interposed ceramic, or may be accomplished by cooling the ceramic cylinder through its principal Curie point while subjecting to a lesser polarizing field in the neighborhood of 6–10 volts per .001 inch of ceramic. If the ferroelectric ceramic cylinder comprises barium titanate, this principal Curie point is in the neighborhood of 120 degrees centigrade. Such methods of activation are well known to those skilled in the art and will, therefore, not be further described here.

In the embodiment of my invention shown in Fig. 1, it is necessary, because of the high voltages involved, to activate the ceramic cylinder 10 first and then to assemble the transducer. Electrodes 11 and 12 may be applied to cylinder 10 after activation, or may be applied first and the activating voltages supplied thereto. If the inner and outer cylindrical surfaces of cylinder 10 are silvered to provide electrodes 11 and 12, such silvered electrodes must be applied before activation because the heat employed in the silvering process is normally sufficient to desensitize the ceramic cylinder 10. The radial electric field produced between electrodes 11 and 12 by a voltage supplied therebetween is in the proper direction to provide the desired radial mode of activation in the ceramic cylinder 10.

Referring now to Fig. 2, I have shown a modification of my invention whereby the ceramic cylinder 10 may be piezoelectrically activated after the transducer has been completely assembled and may be reactivated at any time without disassembly. The principal problem involved is that of preventing arc-over between components of the transducer that are in substantially equi-potential relation with respective ones of electrodes 11 and 12, such as from the internal electrode 11 to the end plates 13 and 14 when the intense voltages necessary for activation of cylinder 10 are supplied between electrodes 11 and 12. The construction of the transducer of Fig. 2 is, in general, similar to that of Fig. 1 and similar parts have been designated by the same numerals followed by the distinguishing letter "a."

The principal difference between the transducer of Fig. 2 over that of Fig. 1 is that disks 28 and 29, composed of a high voltage insulating matrial, such as Bakelite, are seated within accommodating cavities 30 and 31 formed in end plates 13a and 14a respectively in order to prevent arcing from inner electrode 11 to the body of the end plates. Additional annular insulating spacers 32 function both to position disks 28 and 29 and to impede arcing along the end surfaces of cylinder 10. A high voltage coaxial cable 19a is preferably employed, and the insulation 33 surrounding the inner conductor 18a extends substantially to the point of connection between the inner conductor 18a and electrode 11a and serves to prevent arcing to the central bolt 15a. The position of cable entry into the interior of the cylinder 10 is also moved as far as possible away from electrode 11a in order to extend the path of possible arcing through the cable aperture 34. Outer conductor 20a of cable 19a is, of course, connected to end plate 14a upon the side of insulating disk 29 that is remote from electrode 11a.

It will be appreciated that the distance, $d$, from bolt 15a to inner eelctrode 11a must be great enough that arcing will not occur between these members when the intense activation voltages are supplied to electrodes 11a and 12a through cable 19a. If the desired resonant frequency of cylinder 10a is such that the distance "$d$" is less than that required to prevent arcing, an insulating sheath may be provided which covers the exposed portion of bolt 15a or, alternatively, the interior of cylinder 10a may be completely filled with a liquid insulating medium 9, such as oil.

The characteristics of a tranducer such as described above, depend primarily on the dimensions of the ceramic cylinder 10. The resonant frequency of the transducer is primarily determined by the radial dimension, i.e. the unit is in resonance when the distance between the inner and outer surfaces, of the cylinder 10 is equal to an odd multiple of a one-half wave length. A radial dimension of one inch, for example, corresponds to one-half wave length in barium titanate ceramic for an operating frequency of approximately 80 kilocycles.

The directivity of the resulting transmission or reception pattern, in other words, the beam width, is determined principally by the "thickness" of the ceramic cylinder as measured axially. In general, the greater the axial dimension, the more directive will be the resultant beam pattern. Units operated at a frequency of 60 kilocycles with an axial dimension of about three inches were found to have approximately a 30 degree beam width at points 6 decibels below the peak response. Similar units having an axial dimension of approximately one inch are found to have a beam width at corresponding points of about 90 degrees. When properly activated, the sensitivity of the unit is comparable with the best piezoelectric crystal or magneto-strictive assemblies producing an equivalent toroidal pattern.

Although I have shown outer electrode 12 in direct contact with the compressional wave medium, it will be appreciated that suitable fluid shields may be interposed between the electrode 12 and the fluid medium. A rubber diaphragm, for example, having substantially the same compressional wave transmission characteristics as the surrounding fluid may be secured to the transducer in a manner covering the outer electrode 12. Similarly, electrostatic shielding devices, such as metallic barriers, may also be disposed around the periphery of the device in order to prevent electric intercoupling such as might occur between adjacent receiving and transmitting transducers.

It will thus be seen that I have provided a very simple but rugged compressional wave transducer capable of transmitting or receiving compressional waves in the form of a toroidal pattern. Moreover, the unit may be easily adapted to be activated to exhibit piezoelectric properties after assembly, and, therefore, may be easily reactivated if, for any reason, it should lose sensitivity.

It is to be understood that although I have shown a particular embodiment of the invention, many other modifications may be made and I intend, therefore, by the appended claims to cover all such modifications as fall within the true spirit and scope of the invention.

What I claim as new and desire to secure by Letters Patent of the United States is:

1. A transducer for receiving or transmitting a toroidal pattern of high frequency compressional wave energy in a fluid medium comprising, a hollow polycrystalline ferroelectric ceramic cylinder having radial mode piezoelectric properties and having high frequency mechanical resonance, a pair of electrodes in conductive relation with the inner and outer cylindrical surfaces respectively of said cylinder, separate connections to each electrode, and a pair of end plates covering opposite ends of said cylinder in a fluid tight manner preventing passage of fluid to the interior of said cylinder, the electroded outer cylindrical surface of said cylinder being exposed for contact with a fluid medium sustaining the compressional waves.

2. The transducer of claim 1 wherein the polycrystalline ferroelectric ceramic cylinder comprises principally barium titanate.

3. A transducer for receiving or transmitting high frequency compressional wave energy in a fluid medium comprising, a hollow polycrystalline ferroelectric ceramic cylinder having radial piezoelectric activation and being mechanically resonant to a high frequency above several kilocycles, a pair of film like electrodes covering inner and outer cylindrical surfaces respectively of said cylinder in good conductive relation therewith, a pair of end plates covering opposite ends of said cylinder in a fluid tight manner preventing passage of fluid to the interior of said cylinder, a first connection to the outer surface electrode, and a second connection to the inner surface electrode inserted through one of said end plates, the electroded outer cylindrical surface of said cylinder being exposed for contact with a fluid medium sustaining the compressional waves, and said cylinder being dimensioned axially to have a directive toroidal compressional wave energy translation pattern at said electroded outer cylinder surface.

4. A transducer for transmitting high frequency compressional wave energy in a fluid medium comprising, a hollow barium titanate ceramic cylinder, a first film-like electrode covering the inner cylindrical surface of said cylinder in good conductive relation therewith, a second film like electrode covering the outer cylindrical surface of said cylinder in good conductive relation therewith and exposed for contact with a fluid medium, a pair of end plates covering opposite ends of said cylinder in a fluid tight manner preventing passage of fluid to the interior of said cylinder, a first conductor connected to said outer surface electrode and a second conductor passing through one of said end plates and connected to the inner surface electrode, said cylinder being activated to vibrate radially when a voltage is supplied between said electrodes, being dimensioned radially for mechanical resonance at a high frequency above several kilocycles, and being dimensioned axially to have a directive toroidal transmission pattern from said electroded outer cylindrical surface.

5. A transducer for receiving high frequency compressional wave energy from a fluid medium comprising, a hollow barium titanate ceramic cylinder, a pair of film like electrodes covering inner and outer cylindrical surfaces respectively of said cylinder in good conductive relation therewith, separate connections to each electrode, and a pair of end plates covering opposite ends of said cylinder in a fluid tight manner, said electroded outer cylindrical surface being exposed for contact with a fluid medium sustaining the compressional waves, said cylinder being activated to produce a voltage between said electrodes when subjected to a radial deformation, being dimensioned radially for resonance at a high frequency above several kilocycles, and being dimensioned axially to have a directive toroidal sensitivity pattern to compressional waves incident upon the electroded outer cylindrical surface of said cylinder.

6. A transducer for receiving or transmitting a toroidal pattern of high frequency compressional wave energy in a fluid medium comprising, a hollow polycrystalline ferroelectric ceramic cylinder activated to exhibit piezoelectric properties along radial lines and mechanically resonant to a frequency above several kilocycles, a pair of film like electrodes covering inner and outer cylindrical surfaces respectively of said cylinder in good conductive relation therewith, said electroded outer cylindrical surface of said cylinder being exposed for contact with a fluid medium sustaining the compressional waves, separate connections to each electrode, and a pair of end plates covering opposite ends of said cylinder in a fluid-tight manner preventing passage of fluid to the interior of said cylinder, said interior of said cylinder being filled with a voltage insulating liquid.

7. A transducer for compressional wave energy comprising, a hollow polycrystalline ferroelectric ceramic cylinder having radial mode piezoelectric properties, a pair of film-like electrodes covering inner and outer cylindrical surfaces respectively of said cylinder, separate connections to each electrode, and insulating means arranged to prevent arcing between components of said transducer that are in substantially equi-potential relation with respective ones of said electrodes when a high voltage is supplied between said electrodes after assembly of said transducer.

8. A transducer for compressional wave energy comprising, a hollow polycrystalline ferroelectric ceramic cylinder having radial piezoelectric activation, a pair of film-like electrodes covering inner and outer cylindrical surfaces respectively of said cylinder in good conductive relation therewith, a pair of end plates covering opposite ends of said cylinder in a fluid-tight manner preventing passage of fluid to the interior of said cylinder, a first electrical connection to the outer surface electrode, a second electrical connection passing through one of said end plates to the inner surface electrode, and insulating means arranged to insulate said inner electrode and said second connection from said end plates whereby said ceramic cylinder may be piezoelectrically activated after assembly of said transducer.

9. A transducer for compressional wave energy comprising, a hollow polycrystalline ferroelectric ceramic cylinder having radial mode piezoelectric properties, a pair of film-like electrodes covering inner and outer cylindrical surfaces respectively of said cylinder in good conductive relation therewith, a pair of end plates covering opposite ends of said cylinder in a fluid-tight manner preventing passage of fluid to the interior of said cylinder, a first connection to the outer surface electrode, and a second connection to the inner surface electrode comprising an insulated cable passed through one of said end plates, and insulating means interposed between said end plates and said cylinder ends whereby arc-over from said inner electrode to said plates is prevented if a high voltage is supplied between said electrodes after assembly of said transducer.

References Cited in the file of this patent

UNITED STATES PATENTS

| | | |
|---|---|---|
| 2,076,330 | Wood | Apr. 6, 1937 |
| 2,405,226 | Mason | Aug. 6, 1946 |
| 2,456,294 | Massa | Dec. 14, 1948 |
| 2,472,388 | Thuras | June 7, 1949 |
| 2,473,354 | Benioff | June 14, 1949 |
| 2,486,560 | Gray | Nov. 1, 1949 |
| 2,521,642 | Massa | Sept. 5, 1950 |
| 2,564,562 | Chess | Aug. 14, 1951 |
| 2,565,158 | Williams | Aug. 21, 1951 |
| 2,565,159 | Williams | Aug. 21, 1951 |
| 2,607,858 | Mason | Aug. 19, 1952 |
| 2,625,663 | Howatt | Jan. 13, 1953 |
| 2,732,536 | Miller | Jan. 24, 1956 |
| 2,767,387 | Langevin | Oct. 16, 1956 |

OTHER REFERENCES

Proceedings of the AIEE, September 1950, pp. 285–289, "The Structure, Electrical Properties and Potential Applications of the Barium Titanate Class of Ceramic Materials."

Bell Laboratories Record, August 1949, vol. XXVII, No. 8, pp. 285–289, "Titanate Ceramics for Electromechanical Purposes."

Industrial and Engineering Chemistry, February 1950, vol. 42, pp. 264–268, "Titanate Ceramics for Electromechanical Purposes."